US012753887B2

(12) United States Patent
Daeschner et al.

(10) Patent No.: US 12,753,887 B2
(45) Date of Patent: Oct. 6, 2026

(54) LED LIGHT SOURCE COMPRISING HOLLOW PEDESTAL SUPPORTING TRANSPARENT OPTICAL ELEMENT

(71) Applicant: LUMILEDS LLC, San Jose, CA (US)

(72) Inventors: Walter Daeschner, Los Altos, CA (US); Yu-Chen Shen, Sunnyvale, CA (US); Grigoriy Basin, San Francisco, CA (US)

(73) Assignee: LUMILEDS LLC, San Jose, CA (US)

(*) Notice: Subject to any disclaimer, the term of this patent is extended or adjusted under 35 U.S.C. 154(b) by 0 days.

(21) Appl. No.: 18/802,576

(22) Filed: Aug. 13, 2024

(65) Prior Publication Data

US 2026/0049696 A1 Feb. 19, 2026

(51) Int. Cl.

| | |
|---|---|
| ***F21K 9/68*** | (2016.01) |
| ***F21K 9/66*** | (2016.01) |
| ***F21V 9/14*** | (2006.01) |
| ***F21Y 115/10*** | (2016.01) |

(52) U.S. Cl.

CPC .................. *F21K 9/68* (2016.08); *F21K 9/66* (2016.08); *F21V 9/14* (2013.01); *F21Y 2115/10* (2016.08)

(58) Field of Classification Search

CPC ................. F21K 9/68; F21K 9/66; F21V 9/14
See application file for complete search history.

(56) References Cited

U.S. PATENT DOCUMENTS 7,025,464 B2 * 4/2006 Beeson .................. G03B 21/28 353/30
7,144,131 B2 * 12/2006 Rains ........................ F21V 7/26 362/231
7,717,591 B2 * 5/2010 Weaver, Jr. .............. H05K 3/28 362/241
8,162,498 B2 * 4/2012 Ramer .................. F21V 14/003 362/293
8,476,650 B2 * 7/2013 Liao .................... H01L 25/0753 257/E33.056
8,506,105 B2 * 8/2013 Sharma ...................... F21V 3/02 362/373
9,029,891 B2 * 5/2015 Muramatsu .............. H05K 3/10 257/676
9,776,561 B2 * 10/2017 Ito ............................ B60Q 3/14
(Continued)

FOREIGN PATENT DOCUMENTS

| | | | |
|---|---|---|---|
| EP | 1729350 | A2 | 12/2006 |
| EP | 1729350 | A3 | 12/2006 |
| WO | 2024/006197 | A1 | 1/2024 |

OTHER PUBLICATIONS

The extended European Search Report, 25194099.5, Dec. 16, 2025, 8 pages.

*Primary Examiner* — Bryon T Gyllstrom

(57) ABSTRACT

An LED light source comprises a hollow pedestal comprising side walls having reflective interior surfaces that define sides of an internal cavity. An LED mounting surface is disposed within the cavity, with one or more LEDs disposed on the LED mounting surface. A light transmitting optical element is disposed opposite from the mounting surface, spaced apart from the one or more LEDs, and supported by the pedestal side walls. The LED light source provides a narrowed radiation pattern that may, for example, be advantageously employed for backlighting LCOS and other displays.

19 Claims, 3 Drawing Sheets

(56) References Cited

U.S. PATENT DOCUMENTS

| | | | | |
|---|---|---|---|---|
| 2006/0012991 | A1* | 1/2006 | Weaver, Jr. | F21K 9/00 257/E25.02 |
| 2007/0047261 | A1* | 3/2007 | Thompson | G02F 1/133606 362/623 |
| 2009/0207614 | A1* | 8/2009 | Cheng | F21V 17/02 362/268 |
| 2009/0296389 | A1* | 12/2009 | Hsu | H01L 33/56 257/98 |
| 2012/0069547 | A1* | 3/2012 | Gielen | F21K 9/62 362/310 |
| 2023/0155079 | A1 | 5/2023 | Kim et al. | |

* cited by examiner

LED LIGHT SOURCE COMPRISING HOLLOW PEDESTAL SUPPORTING TRANSPARENT OPTICAL ELEMENT

FIELD OF THE INVENTION

The invention relates generally to LED light sources and to displays comprising such light sources.

BACKGROUND

Semiconductor light emitting diodes and laser diodes (collectively referred to herein as "LEDs") are among the most efficient light sources currently available. The emission spectrum of an LED typically exhibits a single narrow peak at a wavelength determined by the structure of the device and by the composition of the semiconductor materials from which it is constructed. By suitable choice of device structure and material system, LEDs may be designed to operate at ultraviolet, visible, or infrared wavelengths. LEDs may be combined with one or more wavelength converting materials (generally referred to herein as "phosphors") that absorb light emitted by the LED and in response emit light of a longer wavelength.

Inorganic LEDs and phosphor converted LEDs may be used to create different types of displays including, for example, augmented-reality (AR) displays, virtual-reality (VR) displays, and mixed-reality (MR) displays.

SUMMARY

A display system may comprise, for example, a liquid crystal on silicon (LCOS) array backlit by light emitted by a light source comprising (e.g., red, green, and blue) LEDs. The light emitted by the LEDs is typically collected by a collection optic or optical system that directs the light to the LCOS array. An LED die typically emits in a wide radiation pattern. The inventors recognize that in such an LED backlit display system light emitted by the LEDs at wide angles may not be collected by the collection optic or optical system or may be incident on the collection optic or optical system at undesirably large angles.

This specification discloses LED light sources providing a narrowed radiation pattern suitable for backlighting LCOS and other displays. In one embodiment, such a light source comprises a hollow pedestal comprising side walls having reflective interior surfaces that define sides of an internal cavity. An LED mounting surface is disposed within the cavity, with one or more LEDs disposed on the LED mounting surface. A light transmitting optical element is disposed opposite from the mounting surface, spaced apart from the one or more LEDs, and supported by the pedestal side walls.

The light source may comprise three or more LEDs each configured to emit a different color. For example, the light source may comprise a red emitting LED, a green emitting LED, and a blue emitting LED.

The light transmitting optical element may be or comprise, for example, a planar glass window, a curved glass window, a lens, a metalens, an array of microlenses, a grating, a polarizer, or a combination thereof. The optical element may comprise an antireflective (AR) coating on surfaces facing the LEDs, on surfaces facing away from the LEDs, or on surfaces facing the LED and on surfaces facing away from the LEDs.

The reflective interior surfaces of the side walls may for example be specularly reflective or be reflectively light scattering. The reflective interior surfaces may for example be or comprise Distributed Bragg Reflectors. The reflective interior surfaces may for example be or comprise reflective metal (e.g., aluminum) coatings.

The light transmitting optical element may for example be disposed on and supported by end surfaces of the pedestal side walls. The light transmitting optical element may for example be disposed on and supported by side wall features disposed within the cavity. Such side wall features may for example be or comprise stepped portions of the side walls.

The side walls support the light transmitting optical element at a distance of, for example, about 0 microns to about 500 microns above the LEDs. The side walls extend above the LEDs (and optionally past the optical element) for a distance of about 0 microns to about 500 microns.

The side wall reflective internal surfaces may be oriented perpendicular to the LED mounting surface. Alternatively, the side wall reflective internal surfaces may be angled at other than 90 degrees with respect to the mounting surface to better reflect light emitted by the LEDs toward the light transmitting optical element. Angled side wall reflective internal surfaces may define a cavity having a width parallel to the mounting surface greater at the light transmitting optical element than at the mounting surface.

The mounting surface may optionally be reflective. A light scattering material (e.g., titanium dioxide particles in silicone) may be disposed in the cavity between the LEDs and the side wall reflective interior surfaces. Such light scattering material may for example fill the cavity from the mounting surface to the optical element. Alternatively, no such light scattering material is present and the cavity may be filled with air, for example.

Two or more hollow pedestals as described above may be stacked. For example, in another embodiment a light source may comprise a first hollow pedestal comprising side walls having reflective interior surfaces that define sides of an internal cavity. An LED mounting surface is disposed within the cavity of the first hollow pedestal. One or more LEDs are disposed on the LED mounting surface. A first light transmitting optical element is disposed opposite from the mounting surface, spaced apart from the one or more LEDs, and supported by the first hollow pedestal side walls. The light source further comprises at least a second hollow pedestal stacked on the first hollow pedestal. The second hollow pedestal comprises sidewalls having reflective interior surfaces that define sides of an internal cavity aligned with the internal cavity of the first hollow pedestal. A second light transmitting optical element is spaced apart from the first light transmitting optical element and supported by the second hollow pedestal side walls.

The second hollow pedestal side walls support the second light transmitting optical element at a distance of, for example, about 0 microns to about 500 microns from the first light transmitting optical element.

Characteristics of the first hollow pedestal, the LEDs, the mounting surface, and the first optical element may be varied as described above with respect to the first embodiment. Characteristics of the second hollow pedestal and the second optical element may be varied as described with respect to the hollow pedestal and the optical element in the first embodiment. In one variation, the first light transmitting optical element is or comprises a linear polarizer.

The light source of the second embodiment may comprise additional hollow pedestals identical or similar to the second hollow pedestal described above and forming with the first and second hollow pedestals a stack of three or more hollow pedestals, with each hollow pedestal in the stack optionally supporting an optical element. In such variations the spacing between optical elements may be, for example, as described above with respect to the spacing between the first optical element and the second optical element.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention.

As summarized above, this specification discloses LED light sources providing a narrowed radiation pattern suitable for backlighting LCOS and other displays. The LED light sources comprise one or more LEDs (e.g., red, green, and blue LEDs) disposed within a cavity defined by the interior walls of a hollow pedestal. The pedestal supports an optical element above the LEDs. The optical element may be for example a flat or curved (e.g., glass) window, a lens, a metalens, a grating, a polarizer, or any other suitable optic. The optical element may for example be or comprise an array of microlenses. Surfaces of the interior walls of the pedestal are reflective (e.g., specularly reflective or scattering) to light emitted by the LEDs. Light emitted by the LEDs incident on the interior walls of the pedestal is reflected within the cavity and may exit the cavity incident on and transmitted through the optical element supported by the pedestal.

The angular width of the radiation pattern exiting the light source through the optical element supported by the pedestal is controlled in part by the height to which the pedestal side walls extend above the LEDs. The radiation pattern provided by the light source may be narrowed to satisfy constraints of the collection optic or optical system in a display system as described above by suitable choice of the pedestal side wall height.

Figure 1:
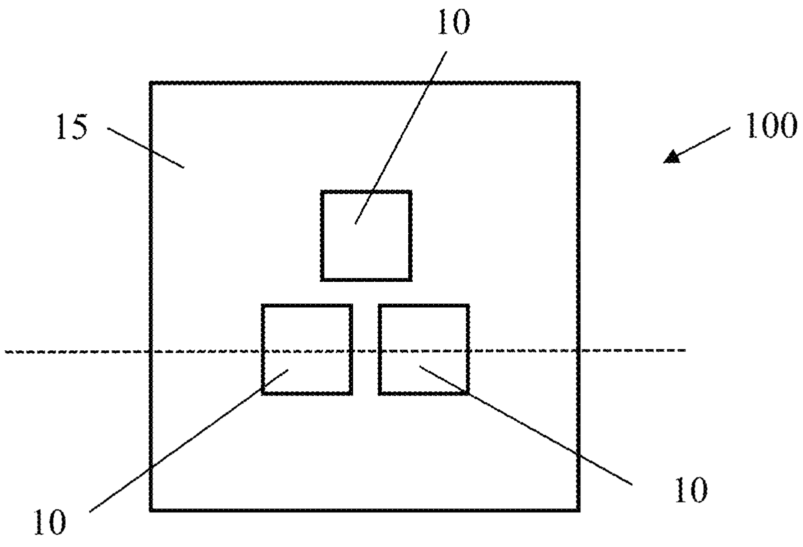
FIG. 1 schematically illustrates a top view of an example LED package.

FIG. 1 shows a schematic top view of an example LED package 100 comprising (e.g., red, green, and blue) LEDs 10 disposed on an LED mounting surface 15 of the package.

Figure 2:
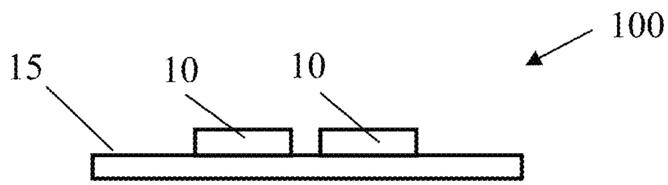
FIG. 2 schematically illustrates a cross-sectional view of the LED package of FIG. 1 taken along the dashed line shown in FIG. 1.

FIG. 2 shows a schematic cross-sectional view of the LED package 100 taken along the dashed line shown in FIG. 1. Mounting surface 15 typically comprises electrical contacts or pads providing electrical service to the LEDs. The disposition of LEDS 10 on mounting surface 15 is depicted schematically. Rather than being disposed directly on mounting surface 15 as shown LEDs 10 may for example be disposed on submounts (not shown) or other structure providing electrical service to the LEDs and elevating the LEDs above mounting surface 15 to an intermediate position within the cavity. Mounting surface 15 may for example be a surface of a tile.

Figure 3:
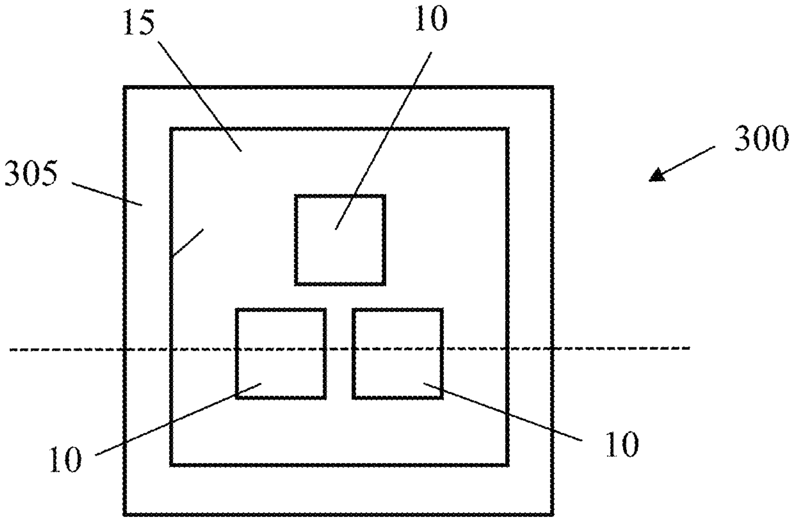
FIG. 3 schematically illustrates a top view of an example light source comprising the LED package of FIG. 1 and a hollow pedestal disposed on the LED package.

FIG. 3 shows a schematic top view of an example light source 300 comprising the LED package of FIG. 1 and a hollow pedestal 305 disposed on mounting surface 15. Interior surfaces 310 of side walls of the pedestal define a cavity (thus making the pedestal hollow) in which the LEDs 10 are disposed, and as noted above are reflective to light emitted by the LEDs.

Figure 4:
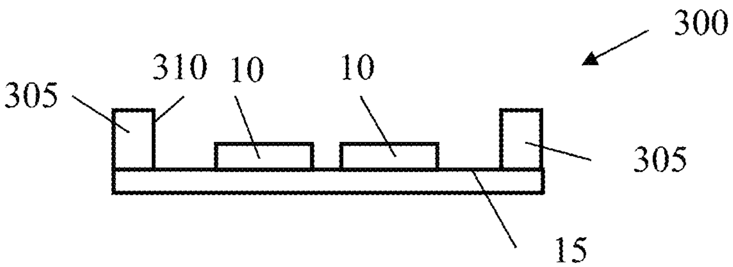
FIG. 4 schematically illustrates a cross-sectional view of the light source of FIG. 3 taken along the dashed line in FIG. 3.

FIG. 4 shows a schematic cross-sectional view of the light source 300 of FIG. 3 taken along the dashed line in FIG. 3. The width of the cone angle of the light emitted (generally upward, in FIG. 4) from light source 300 is determined in part by the height to which interior surfaces 310 extend above the LEDs.

Figure 5:
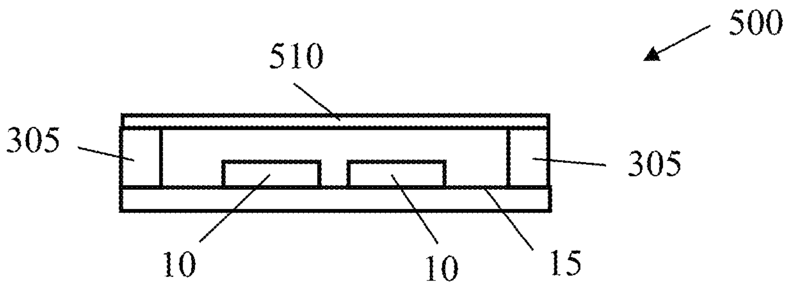
FIG. 5 schematically illustrates a cross-sectional view of an example light source comprising the light source of FIG. 3 and an optical element disposed on and supported by the hollow pedestal.

FIG. 5 shows a schematic cross-sectional view of an example light source 500 comprising the light source 300 of FIG. 3 and FIG. 4 and an optical element 510 disposed on and supported by end surfaces of the pedestal side walls, above the LEDs.

Figure 6:
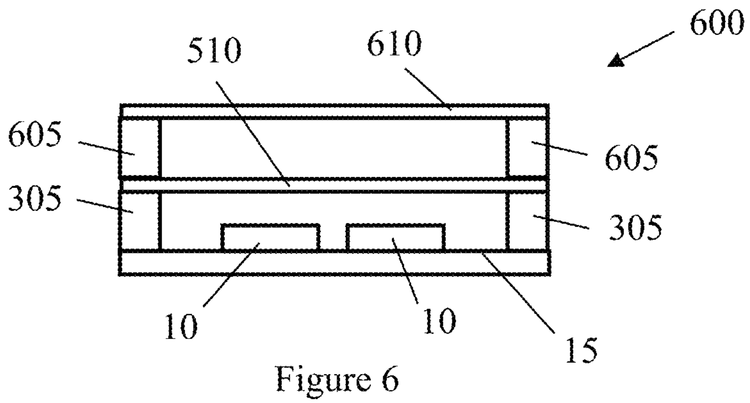
FIG. 6 schematically illustrates a cross-sectional view of an example light source in which a second hollow pedestal is stacked upon the hollow pedestal of the example light source of FIG. 5.

FIG. 6 shows a schematic cross-sectional view of an example light source 600 in which a second hollow pedestal 605 is stacked upon hollow pedestal 305 of example light source 500. Side walls of hollow pedestal 605 optionally support a second optical element 610. Interior surfaces of the sidewalls of hollow pedestal 605 are reflective (e.g., specularly reflective or scattering) to light emitted by the LEDs. Additional hollow pedestals similar or identical to hollow pedestal 605 may be stacked upon example light source 600.

Figure 7:
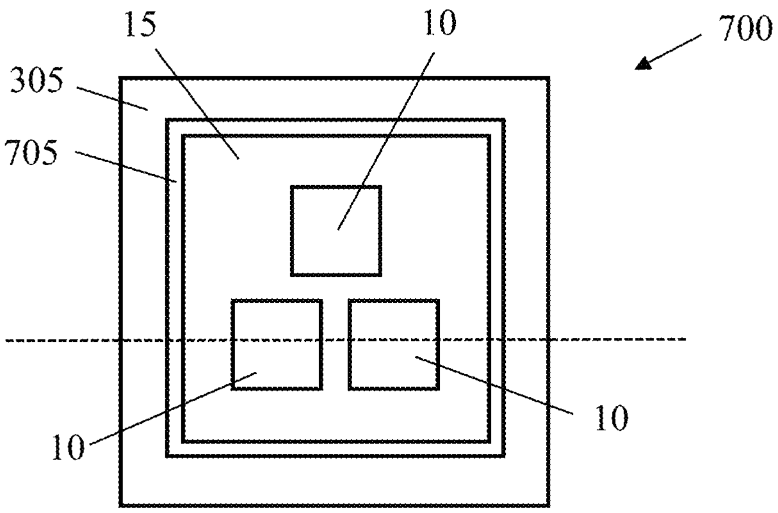
FIG. 7 schematically illustrates a top view of another example light source.
Figure 8:
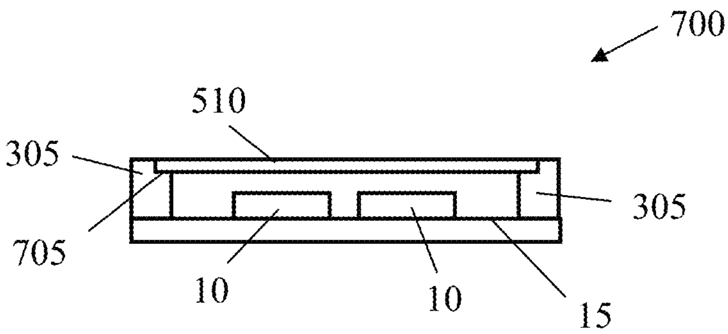
FIG. 8 schematically illustrates a cross-sectional view of the light source of FIG. 7 taken along the dashed line in FIG. 7.

FIG. 7 shows a schematic top view of an example light source 700, and FIG. 8 shows a schematic cross-sectional view of light source 700 along the dashed line in FIG. 7. Light source 700 differs from light source 500 (FIG. 5) by comprising a feature (as illustrated, a step) 705 in the interior surface of the hollow pedestal side wall. Further, in light source 700 optical element 510 is disposed on and supported by feature 705 rather than by end surfaces of the pedestal side walls. Although not shown in FIG. 7, in light source 700 the pedestal side walls and their reflective interior surfaces may optionally extend above feature 705 and optical element 510 to further narrow the width of the cone angle of light emitted by light source 700. For example, a step-like feature 705 may be deeper (e.g., substantially deeper) than the thickness of optical element 510.

In the illustrated examples the reflective interior surfaces of the hollow pedestal side walls are oriented perpendicular to mounting surface 15. As noted above, the reflective interior surfaces of the hollow pedestal side walls may be angled at other than 90 degrees (e.g., at 45 degrees) with respect to the mounting surface to better reflect light emitted by the LEDs toward the optical element. Such angled reflective interior surfaces may define a cavity having a width parallel to the mounting surface 15 greater at the light transmitting optical element 510 than at the mounting surface 15.

In the illustrated example the hollow pedestals are schematically depicted as comprising a cavity with a square cross section in the plane of the mounting surface. Alternatively, the hollow pedestal side wall interior reflective surfaces defining the cavity may for example substantially conform in shape to the arrangement of LEDs on the mounting surface. The hollow pedestal sidewall interior reflective surfaces may be for example a distance of about 0 microns to about 100 microns, for example about 50 microns, from the LEDs.

The LEDs may be, for example, III-Nitride LEDs that emit ultraviolet, blue, green, or red light. LEDs formed from any other suitable material system and that emit any other suitable wavelength of light may also be used. Other suitable material systems may include, for example, III-Phosphide materials, III-Arsenide materials, and II-VI materials. The LEDs may be direct-emitting LEDs or phosphor converted LEDs. Any suitable phosphor materials may be used.

The LEDs may be top emitting LEDs. Alternatively, the LEDs may be side emitting LEDs.

The hollow pedestals may be made from, for example, silicon, aluminum covered silicon (e.g., to provide reflective interior surfaces), ceramics, or any other suitable material that is or can be made reflective (e.g., with a reflective coating) and can support an optical element as described above.

The optical elements may have a thickness of, for example, about 25 microns to about 1000 microns, for example about 200 microns.

The LED packages (e.g., package 100 in FIG. 1) may for example be square or rectangular, for example square with side dimensions of about 2 millimeters by about 2 millimeters.

This disclosure is illustrative and not limiting. Further modifications will be apparent to one skilled in the art in light of this disclosure and are intended to fall within the scope of the appended claims.

What is claimed is:

1. A light source comprising:

a first hollow pedestal comprising first side walls having first end surfaces disposed in direct contact with and facing the LED mounting surface, the first side walls having first reflective interior surfaces that define sides of a first cavity and are perpendicular to the first end surfaces, at least part of the LED mounting surface disposed within the first cavity;

one or more LEDs disposed on the LED mounting surface;

a first light transmitting optical element disposed opposite from the LED mounting surface, spaced apart from the one or more LEDs, and supported by and in direct contact with the first end surfaces of the first hollow pedestal;

a second hollow pedestal stacked on the first hollow pedestal, the second hollow pedestal comprising second side walls having second end surfaces, the second hollow pedestal having second reflective interior surfaces that are perpendicular to the second surfaces and define sides of a second cavity aligned with the first cavity of the first hollow pedestal, the first light transmitting optical element in direct contact with the second end surfaces and disposed between the second hollow pedestal and the first hollow pedestal to space them apart; and a second light transmitting optical element spaced apart from the first light transmitting optical element and supported by the second side walls of the second hollow pedestal.

2. The light source of claim 1, wherein the first hollow pedestal side wall reflective internal surfaces are angled with respect to the mounting surface to provide a cavity width parallel to the mounting surface that is greater at the first light transmitting optical element than at the mounting surface.

3. The light source of claim 1 wherein the first light transmitting optical element is or comprises a polarizer.

4. The light source of claim 1, wherein:

the first hollow pedestal side walls support the first light transmitting optical element at a distance of about 0 microns to about 500 microns from the LEDs; and the second hollow pedestal side walls support the second light transmitting optical element at a distance of about 0 microns to about 500 microns from the first light transmitting optical element.

5. The light source of claim 1 wherein the one or more LEDs comprise three or more LEDs each emitting a different color of light.

6. The light source of claim 5 wherein the three or more LEDs comprise a red emitting LED, a green emitting LED, and a blue emitting LED.

7. The light source of claim 1, wherein the first light transmitting optical element is or comprises a planar glass window, a curved glass window, a lens, a metalens, an array of microlenses, a grating, a polarizer, or a combination thereof.

8. The light source of claim 7, wherein the first light transmitting optical element is a glass window.

9. The light source of claim 1 wherein the first and second reflective interior surfaces of the side walls are specularly reflective.

10. The light source of claim 1 wherein the first and second reflective interior surfaces of the side walls are reflectively light scattering.

11. The light source of claim 1, wherein the first and second reflective interior surfaces comprise Distributed Bragg Reflectors.

12. The light source of claim 1, wherein the light transmitting optical element is disposed on and supported by side wall features disposed within the first cavity.

13. The light source of claim 12, wherein the side wall features are or comprise stepped portions of the first side walls.

14. The light source of claim 1, wherein the first side walls support the light transmitting optical element at a distance of about 0 microns to about 500 microns from the LEDS.

15. The light source of claim 1, wherein the first reflective internal surfaces are angled at other than 90 degrees with respect to the mounting surface.

16. The light source of claim 15, wherein a width of the first cavity parallel to the mounting surface is greater at the light transmitting optical element than at the LED mounting surface.

17. The light source of claim 1, wherein the LED mounting surface is reflective.

18. The light source of claim 1, comprising a light scattering material disposed in the first cavity between the LEDs and the first reflective interior surfaces.

19. The light source of claim 18, wherein the light scattering material fills the cavity from the mounting surface to the optical element.

* * * * *